Oct. 17, 1939.　　　G. J. HENNEMAN　　　2,176,339
DENTAL BURR GUARD
Filed Nov. 27, 1936
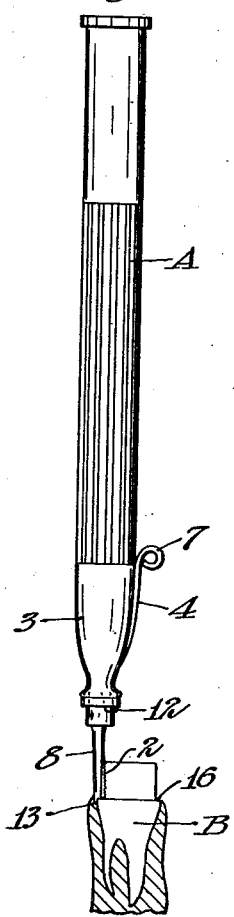
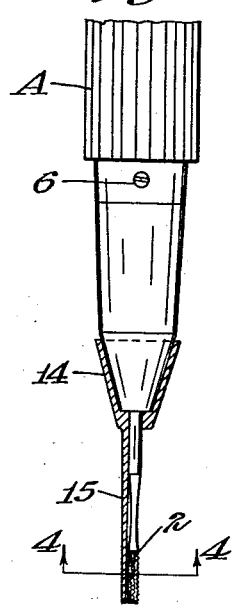
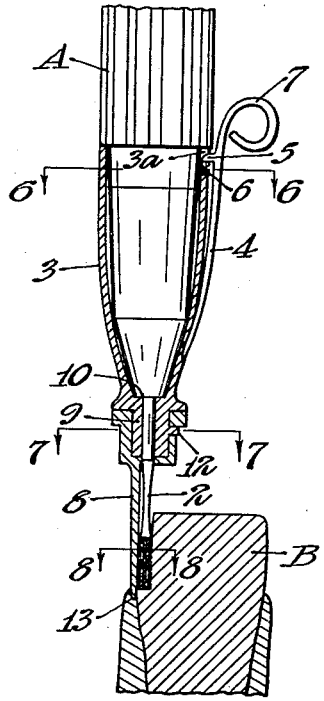
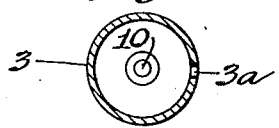
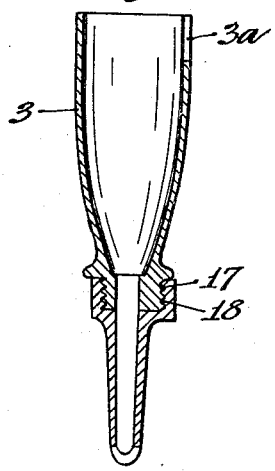
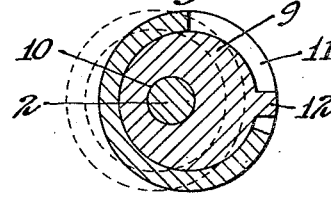
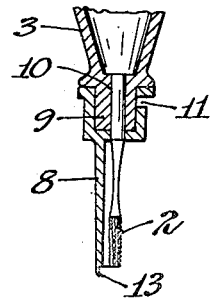
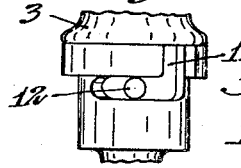
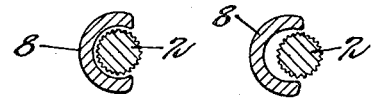
Inventor
Gustave J. Henneman
By　H. S. Johnson
Attorney Patented Oct. 17, 1939

2,176,339

UNITED STATES PATENT OFFICE 2,176,339

DENTAL BURR GUARD

Gustave J. Henneman, Becker, Minn.

Application November 27, 1936, Serial No. 113,032

2 Claims. (Cl. 32—49)

The invention relates to improvements in dental instruments, and particularly to means in connection with a dental burr and its holder to control and regulate the depth of the cut made by a dental burr in trimming a tooth to receive a crown, and in forming a shoulder against which the crown is to fit.

My invention is adapted for use in connection with the ordinary dental burr and its holder, and in carrying out my invention I provide means arranged in connection with the burr and its supporting holder which may be laterally adjusted in relation to the burr to regulate the amount of cutting of the tooth by the burr, and that will cause the forming of a perfect abutment shoulder for the free edge of the crown.

These and other objects of the invention will be more specifically set forth in the following description and the accompanying drawing, wherein:

Figure 1 is a side view of a holder and supported burr fitted with my invention.

Figure 2 is a view in side elevation of a burr holder with supported burr, with a setting device shown in section fitted over the end of the holder and burr to assist in setting the burr in position before the control device for the burr is placed in position.

Figure 3 is a side view of a holder and supported burr with my improved burr control device shown in section.

Figure 4 is a sectional view on line 4—4 of Figure 2.

Figure 5 is a view in vertical section of the end of the burr holder and supported burr, showing my control device arranged in connection therewith, with the parts adjusted to permit a deeper cutting than in the position shown in Figure 3.

Figure 6 is a sectional view on line 6—6 of Figure 3.

Figure 7 is a sectional view on line 7—7 of Figure 3.

Figure 8 is a sectional view on line 8—8 of Figure 3.

Figure 9 is a sectional view on line 8—8 of Figure 3 with the parts adjusted to permit a deeper cutting of the burr than the position shown in Figure 8.

Figure 10 is a view in detail illustrating the adjusting connection between the burr guard and its supporting holder; and Figure 11 is a longitudinal, sectional view of the burr guard and its supporting holder, showing a modified form of adjusting connection between the burr guard and support.

Referring to the drawing in detail, A represents a standard dental burr holder, and 2 a burr secured in the usual manner in the end thereof.

In carrying out my invention, I provide a guard mechanism for the burr consisting of a socket member 3 adapted to be placed over the end of the holder A. The socket member 3 supports upon its side a spring finger 4 formed with suitable means to interlock with the end of the burr holder, such as the inward projection 5 fitting over a set screw 6, projecting outwardly from the burr holder into a notch opening 3—a in the socket member 3. The spring finger 4, as shown, is formed with a finger grip 7 to be grasped in releasing the parts.

Having rotatable adjustable support on the lower end of the socket member 3 is a guard member 8. In the form shown in Figures 1, 3, 5, and 7, the socket member 3 is formed with the projecting cylindrical end portion 9, the end portion 9 being formed with a centrally offset opening 10 through which the shank of the burr passes.

The guard member 8 is rotatably mounted upon the projecting end 9 and is formed with a bayonet slot 11 into which fits a stop 12 projecting outwardly from the side of the end portion 9. By reason of the burr projecting through the end of the socket member in central laterally offset position, the rotation of the guard member will laterally adjust the position of the guard member with relation to the burr, as illustrated in Figures 8 and 9. The guard member, as shown, is cut away upon one side to expose one side of the burr.

The guard member is formed with a projecting end lip 13 to limit the cutting action of the burr, as will be hereinafter more particularly pointed out.

To assist in properly adjusting the burr in the holder A so that the end of the burr will stand in the correct relationship with the end of the guard, I provide the device illustrated particularly in Figure 2. This device consists of a socket member 14 to be fitted over the end of the holder A, the socket member 14 being formed with an extending guard portion 15 similar in shape to the guard portion 8. In use this positioning device is placed over the end of the holder and the burr inserted in position in the end of the holder and adjusted in position until the extreme end of the burr assumes the proper relationship to the end of the guard, and when thus adjusted in the usual manner the holder is manipulated to tighten the burr in position. This presetting device is then removed and the device heretofore described placed in position, as illustrated in Figure 1.

It will, of course, be understood that the dimensions of the presetting device above described so accord with the dimensions of the main guard device hereinbefore described, that when the position of the burr has been regulated by the presetting device it will be positioned so that its end will in use stand in the proper position, as illustrated in Figure 5.

In the modified form shown in Figure 11, the projecting end of the socket member 3 is formed with threads 17 intermeshing with inner threads 18 carried by the upper end of the guard, the burr passing through a centrally offset opening in the projecting end of the socket member in the same manner as in the above described form. As will be evident, the same cam-like operation would take place in the turning of the guard member in this form as in the first described form, to regulate the laterally offset position of the burr.

In operation, with the parts assembled as shown, the device will be used in preparing a tooth B for a crown, as shown in Figure 1, with the projecting end of the guard projecting under the free margin of the gum, and the device being carried around the tooth to cause the burr to evenly cut away the exterior of the tooth to the extent permitted by the adjusted position of the burr. The cutting operation will continue until it is stopped by the projecting finger on the guard coming in contact with the tooth below the cut-away part. It is thus possible to accurately regulate the shoulder 16 and bring about a smooth, even cutting of the tooth beyond the shoulder to permit an accurate and smooth fitting of the crown. As will be evident, by the lateral adjustment of the burr with relation to the guard, the depth of the cut may be accurately regulated.

The device is adapted to be used either in applying a full or a partial crown. Where a partial crown is employed the device is used in the same manner as shown used in Figure 1 to form a shoulder up along the side of the tooth.

The many advantages of my construction will be apparent. The depth of cutting and the smoothness of the shoulder forming is absolutely controlled by the guard. Any gouging by the burr of the cut portion of the tooth is absolutely prevented and accurate predetermination of the depth of the cut is provided for by the adjustment of the burr in relation to the guard. Accuracy in preparing a tooth for receiving a crown is thus assured.

I do not limit myself to the specific construction as shown, but may modify such construction within the scope of the invention, as set forth in the following claims.

While I have illustrated and specifically described my invention in connection with its use for preparing a tooth for a crown, there are other uses it is adapted for as preparing a tooth for certain cavity preparations.

I claim:

1. A guard for a dental burr, a support for said guard adapted to be mounted on a handpiece of a dental instrument mounting a burr, said support comprising a socket member adapted to enclose the end of said handpiece and having a projected end formed with an opening through which said burr is adapted to pass, said guard member having a base portion rotatably mounted upon said end of said socket for movement eccentrically of said opening therethrough, said guard being extended from said base portion and adapted to at least partially surround the end of said burr, and said base portion of said guard being adapted to be rotated on said end of said socket and move said guard radially relative to said burr to adjust said guard with respect to said burr.

2. The structure of claim 1, said end of said socket being cylindrical, and said opening being formed therethrough eccentrically of the longitudinal axis thereof.

GUSTAVE J. HENNEMAN.